Patented Jan. 6, 1942

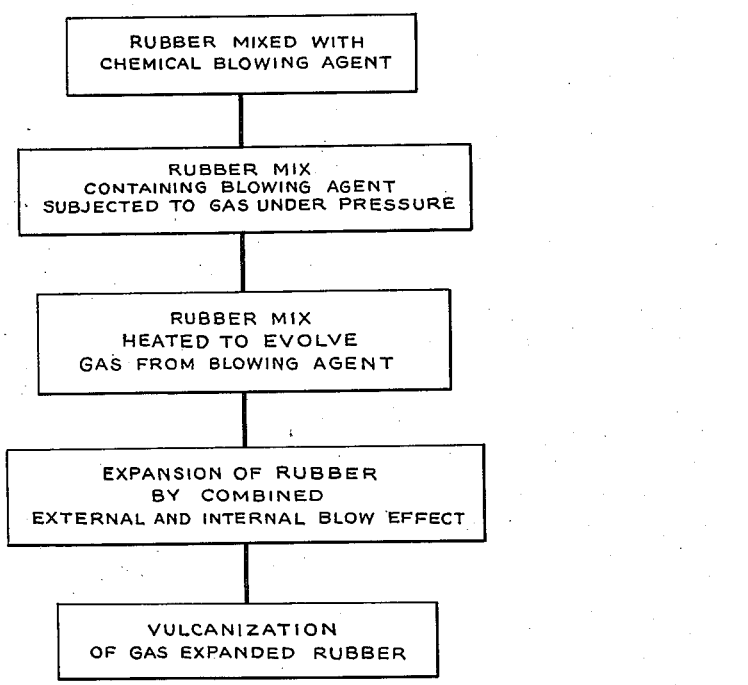

2,268,621

UNITED STATES PATENT OFFICE 2,268,621

GASSING RUBBER BY A COMBINATION OF EXTERNAL AND INTERNAL GASES

Dudley Roberts, New York, N. Y., and Lester Cooper, Monson, Mass., assignors to Rubatex Products, Inc., New York, N. Y., a corporation of Delaware Application September 21, 1937, Serial No. 164,868

4 Claims. (Cl. 260—724)

Our invention relates to a method of making gas expanded rubber and more specifically relates to a method in which a combination of external and internal gassing is employed to form a closed cell gas expanded rubber material.

The term rubber is to be construed broadly as including compounded or uncompounded rubber, rubber in the form of or derived from naturally occurring rubber dispersions or from artificially prepared rubber dispersions whether or not such dispersions contain additional ingredients.

Sponge rubber is an open celled gas expanded rubber with inter-communicating channels extending throughout. Closed cell gas expanded rubber consists of a mass of rubber containing enclosed cells of gas sealed in films of rubber. There is no communication between the cells and no communication to the outside air.

Sponge rubber, made by mixing with a rubber dough chemicals adapted by reaction to evolve gas, has long been known. This rubber was made by incorporating throughout a highly plasticized rubber dough chemicals such as sodium bicarbonate which under heat reacted with acid present to release carbon dioxide. The gas so evolved in the rubber dough expanded the rubber and formed inter-communicating channels throughout giving a sponge-like structure similar to natural sponge. Although such sponge are good substitutes for natural bath sponges, for many purposes they have serious faults.

Conventional sponge rubber has many disadvantages due to the physical characteristics of the material itself. Sponge rubber, for example, absorbs water, other liquids and gases. Secondly it deteriorates more rapidly than the closed cell type material because of greater surface exposure. Thirdly, it lacks resilience. Fourthly, it is distinctly a more dense material. Fifth, it requires greater amount of compression to give equal sealing effect compared with gas expanded cell-tight rubber and therefore a greater volume of conventional sponge rubber is required to accomplish a sealing effect equal to that of gas expanded closed cell rubber. Sixth, it lacks buoyancy in water. Seventh, it is a much poorer insulation material.

Closed cell gas expanded rubber has been produced and has found wide commercial acceptance because of its unique combination of desirable properties. By reason of its closed cell rubber structure, it is resilient, waterproof, possessed of good sound and heat insulating value, extremely light in weight and structurally strong. It is splendidly adapted for use in low cost housing, for example, since by itself it can be used to form walls and roofs without the use of other materials. The properties pointed out above enable it to completely replace the expensive and high labor cost materials such as brick used before in housing. Insulating construction elements in the form of slabs of the closed cell expanded rubber can be slid into friction and adhesive engagement with a grooved framework of steel or wood at a minimum of labor cost and time.

But this closed cell expanded rubber has hitherto been made and could only be made by the use of externally applied gas under high pressure, as for instance nitrogen under 3,000 lbs. per sq. in. The present commercial process of producing gas expanded rubber is set forth and covered in the Denton Patent 1,905,269. This process produces gas expanded closed cell rubber and employs an external application of nitrogen to the rubber of about 3,000 lbs. per sq. in. The use of carbon dioxide gas has been attempted in this art because carbon dioxide has a greater solubility in rubber than nitrogen and lower pressures could be employed. But carbon dioxide because of this solubility in rubber and because of the low carbon dioxide content of the air surrounding the finished closed cell gas expanded rubber diffuses out from the finished product and causes collapse of the structure. For this reason satisfactory results could not be obtained and the Denton process using nitrogen at 3,000 lbs. per square inch has been used.

But the use of a high pressure such as 3,000 lbs. per sq. in. necessitates high pressure pumps and a gassing autoclave of tremendous strength. The gassing autoclave used in the Denton process is very expensive. Its maintenance is high. Further, the gassing of rubber by external application of gas involves a period of time of about three to eight hours. The expensive pressure apparatus and autoclave are thus tied up for long periods of time at each gassing operation. This materially adds to the cost of production of the expanded rubber. The time elements where expensive apparatus and labor are involved is most important in commercial processes.

Thus it can be seen that the prior method of manufacturing closed cell gas expanded rubber was costly both from a standpoint of pressure apparatus and time. For this reason the cost of the material has been relatively high and its universal acceptance has been retarded because of the competition of inferior but far cheaper substitutes.

We have discovered that we may employ a combination of internal and external gassing to produce gas expanded rubber in which a far lower external pressure of gas is needed. This use of comparatively low external pressure eliminates the necessity for the use of the heavy and expensive high pressure gassing apparatus hitherto employed in this art.

Our new process comprises mixing with the rubber a chemical blowing agent in finely divided form throughout the rubber mass, said chemical blowing agent being adapted to react or decompose at a certain point to evolve gas homogeneously throughout the mix. With this internal evolvement of gas from a chemical blowing agent, we employ an external pressure of gas as for example about 500 pounds per square inch carbon dioxide.

Our process involves more than the simple additive action of externally gassing and internally gassing. We have found that the decomposition of the chemical blowing agent within the rubber mass produces small seeds of gas throughout the mass in the form of a mechanical mixture. After the chemical blowing agent is set off by proper influences such as heat, and these small seeds of gas developed homogeneously throughout the mass, a gas is applied externally to the rubber and injected therein under pressure that is very low with respect to the pressure hitherto used in such gassing operations. In the case of nitrogen, the pressure can be on the order of 1500 or 2000 lbs. per sq. inch. When external pressure is used by itself it has been necessary to use a pressure of about 3,000 lbs. per sq. in. The use of a pressure approximately half as great, that is 1,000 or less instead of 3,000 lbs. per sq. in., permits pressure equipment far simpler and much lower in cost. Thus, for our new pressure applying apparatus we may employ sheet steel welded together in proper form in place of the hitherto employed drop forge container. The formation of the gas seeds in the rubber mass by the chemical blowing agent develops loci at which the externally applied gas can center, thus eliminating the necessity for the high pressures which hitherto were necessary to set up these small seeds of gas within the rubber mass.

In addition to the ease of penetration of the external gas when it is used in combination with an internal blowing agent, we have found that expanded rubber of greatly increased volume with respect to a given amount of raw material can be obtained by the use of our novel process. Thus, in the past it has been possible to obtain, by means of internally developed gas, a density on the order of 10 lbs. per cu. ft., and, by the use of an externally applied gas alone, it has been possible to obtain a density on the order of 4½ lbs. per cu. ft. By means of the combined internally developed gas and externally applied gas, it is possible to obtain expanded rubber with a density on the order of 3 lbs. per cu. ft. This matter of unexpectedly low density obtained by means of our novel process is of great importance in this art since low weight is a primary factor both from the standpoint of material load, as in construction work, and what is more important, the low density greatly reduces the production cost of the material since a much larger volume can be produced from a given amount of raw material. Thus, a product volume 50% greater from a given amount of raw material can be produced than was produced in the past by the best of the prior art processes, with higher flotation and insulating value.

A modification of the process set forth herein lies in forming a rubber mix in the ordinary way and incorporating therein uniformly throughout a chemical blowing agent adapted to decompose at a certain temperature. The rubber mix with the chemical blowing agent incorporated therein is then subjected to a gas under pressure in a suitable gassing chamber to gas impregnate the dough throughout its mass. The gas pressure is then released and the gassed rubber mix allowed to expand. At this point sufficient heat is applied either in the gassing chamber or after the gassed and expanded rubber is transferred to some other heating means or placed in molds, to effect the decomposition of the chemical blowing agent and evolve gas therefrom. The gas that has been externally applied to the rubber makes the rubber cellular with respect to the gas so that the already formed cells offer little resistance to the formation and evolution of gas from the chemical blowing agent. Thus, a greatly increased expansion can be obtained exactly at the desired point. Therefore, molded gas expanded rubber articles can be formed in inexpensive molds because the final expansion and therefore the final molding can be effected at a desired point and controlled exactly by temperature.

The drawing is a flow sheet of the steps of the process.

Another important factor of advantage in our process over the processes of the prior art resides in the time element involved. In the past, it has been necessary to employ a gassing cycle on the order of 3 to 8 hours. We have found it possible to employ in our new process a gassing cycle of 2 hours. It is expected that even this time can be materially reduced in further developments in this process. The shortening of the time cycle is readily explainable on simple physical principles. The time involved in this gassing cycle depends primarily upon the time required to secure adequate and complete penetration of the rubber mass by gas externally applied under pressure. When loci of gas have already been developed throughout the mass as by the employment of chemical blowing agents, it can be seen that the entrance of externally applied gas into the mass is greatly facilitated. Since the time element, in this as in any commercial process, is of primary importance in that apparatus and labor are tied up during any long drawn out step, it can be seen that a material reduction of time in this step is of tremendous importance in the art.

Another important advantage of our process resides in the fact that the internal expanded structure of the gas expanded rubber mass can be regulated with respect to the size, placement and spacing of the gas cells. Thus, the chemical blowing agent may be incorporated in the rubber mass in the form of relatively large particles throughout the mass to obtain a rather large volume of gas in separated loci. Alternatively, the chemical blowing agent may be employed in the form of a finely divided powder and homogeneously distributed throughout the mass to produce a larger multiplicity of loci of gas by use of smaller individual cells. The incorporation of the chemical blowing agent may be facilitated by means of mixing with an oil or similar material. Then when the gas is externally applied, and the gas loci developed and enlarged, a gas expanded rubber can be formed with a carefully controlled internal gas cell construction.

With the process above described employing in combination internally developed gas and externally applied gas under pressure either closed cell gas expanded rubber or open cell gas expanded rubber (sponge) can be obtained. The desired end product can be formed by a careful regulation of the fibre strength or mass consistency of the rubber. If the fibre strength of the rubber is carefully maintained, as by partial vulcanization, proper ingredients such as rubber reclaim, or by the employment of ultra fast accelerators so that the strength of the rubber is sufficient to retain the gas developed therein without rupture of the membranes between respective loci of gas, then a closed cell gas expanded rubber is obtained. If the fibre strength of the rubber mass is below this desired point then open cell or sponge rubber is formed.

We have found that an open cell or sponge rubber can be obtained according to the process above set forth with a volumetric expansion far in excess to that obtained by prior process in this art. Thus, it is possible to obtain a sponge rubber with a volumetric expansion on the order of 16–20 to 1.

Thus, our method affords these new and unexpected results over the prior processes of this art:

1. The combination of the externally applied gas with the internally developed gas from chemical blowing agents produce a volume of expansion hitherto unattained in the art by the use of any prior process.
2. Low pressure of externally applied gas may be employed so that the expensive high pressure apparatus hitherto used is unnecessary.
3. Increased volumetric expansion with decreased weight.
4. Regulated internal gas cell structure.
5. Shortened time cycle of gassing operation.

The objects of our invention are:

1. To provide development of a gas within rubber by means of admixed blowing agents and an externally applied gas under pressure.
2. To produce a gas expanded rubber that has been expanded to an unusually great extent.
3. To produce a closed cell gas expanded rubber mixing with rubber a chemical blowing agent in finely divided form and concurrently with the development of gas within the rubber from such chemical blowing agent externally applying a gas under pressure to permeate the rubber and expand the same.
4. To provide an open cell gas expanded rubber by a combination of internal blowing agent and externally applied gas.
5. To provide an open cell or sponge rubber with a volumetric expansion on the order of 16 to 1.
6. To provide a novel process for the production of gas expanded rubber in which pressures of the externally applied gas may be on the order of 1,500 lbs. per sq. in.
7. To provide a novel process for the manufacture of a closed cell gas expanded rubber in which a desired internal gas structure can be obtained.
8. To provide a process for producing gas expanded rubber in which gassing cycles of comparatively short duration may be employed.

We shall now describe specifically the method of our invention.

To obtain our closed cell expanded rubber, we first take the ingredients listed below in, for example, the proportions cited:

Mix 1

| | Parts by weight |
|---|---|
| Rubber, crepe or smoked | 100 |
| Sulphur | 3 to 50 |
| Light calcined magnesia | 6 |
| Gilsonite | 25 |
| Diphenyl guanidine | 2 |
| Low melting bituminous substance (Asphalt) | 25 |

Mix 2

| | Grams |
|---|---|
| Pale crepe rubber | 62.5 |
| Rubber reclaim | 375.0 |
| Sulphur | 7.5 |
| Zenite A* | 1.25 |
| Stearic acid | 2.5 |
| Zinc oxide | 10.0 |

*Zenite A is 97 parts of the zinc salt of mercaptobenzothiazole and 3 parts of tetramethylthiuraminosulphide.

The ingredients of Mix 1 are combined in this way. We first masticate the rubber thoroughly on cold rolls. We then incorporate in the rubber from 3 to 50 parts of sulphur, according to the hardness desired in the ultimate product. After the rubber is thoroughly masticated, we allow it to rest in a cool, dark chamber for a period of approximately 24 hours. We have found that such resting tends to restore to the rubber certain of its natural properties which have been destroyed or disturbed during the final working on the masticating rolls referred to above. It is believed that the disturbance of these properties is caused by the disarrangement of the molecular structure of the rubber, which structure is believed to be in a spiral or extended form. The violent working of the rubber on the rolls tends to throw this molecular arrangement off normal and the period of rest referred to above apparently allows the molecular arrangement to be regained. After this rest period we again work the rubber on the rolls and incorporate therein the calcined magnesia, the asphalt, and gilsonite to lend the desirable properties to the rubber structure. Diphenyl guanidine is added to obtain a partial set at a comparatively low temperature.

Similarly the ingredients of Mix 2 are compounded to form a rubber mix in the manner indicated above.

There is now incorporated in the rubber mix a chemical blowing agent adapted either by reaction or by the influence of heat to evolve a gas in the rubber dough which will develop a pressure therein and cause bubbles of gas to form and so expand the dough. This chemical blowing agent is preferably distributed uniformly throughout the rubber in a finely divided form to secure a uniformly expanded mass. Oil may be mixed with the finely divided particles to obtain a paste. The paste when incorporated with the rubber is most effective for such uniform distribution of the particles.

As blowing agents two different groups of chemicals present themselves as suitable:

I. Chemicals which react with other chemicals to produce a gas, and

II. Chemicals which decompose and evolve gas under the influence of certain effects, such as, for instance, heat.

As an example of Group I, we present two chemicals which react in the dough to produce nitrogen gas:

$$NaNO_2 + NH_4Cl \rightarrow NaCl + NH_4NO_2 \rightarrow N_2 + 2H_2O$$

As examples of Group II:

$$C_6H_5N:N.NHC_6H_5 \rightarrow C_6H_5NHC_6H_5 + N_2 \uparrow$$
Diazoaminobenzene     explodes

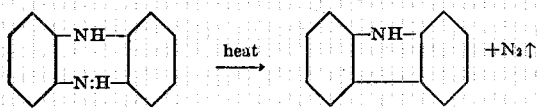

Diazoaminomethane $CH_3.N:N.NH.CH_3 \xrightarrow{heat} CH_3NHCH_3 + N_2 \uparrow$ The class of chemicals represented by Group II are preferred.

The rubber mix containing the finely divided chemical blowing agent is now placed in a chamber and there subjected to an externally applied gas pressure as for example on the order of 500 lbs. per sq. in. of carbon dioxide for a period of one and one-half hours. Preferably concurrently, heat is applied so that the chemical blowing agent contained therein is decomposed to cause evolution of a gas within the rubber. The combination of development of seeds of gas within the rubber plus the gas that is applied externally causes a large amount of gas to be enclosed within the mass at the loci of gas evolution set up by the chemical blowing agent.

There are two methods by which this combination of blowing influences may be utilized. First the chemical blowing agent, dispersed and homogeneously distributed throughout the rubber mix as by means of an oil or paste, can be decomposed at the proper point to evolve gas in the form of small bubbles throughout the mass. Thus loci of gas formation are set up as desired throughout the rubber mix. Thereafter, the rubber mix is subjected to the action of a gas such as nitrogen or carbon dioxide under pressure. The gas penetrates into the rubber from without, and centralizes in each of these loci of gas and develops therein a cell of gas under pressure.

The consistency of the rubber is regulated, as will be set forth hereinafter, to predetermine whether a closed cell or open cell structure is to be obtained. If a sufficient fibre strength is imparted to the rubber mix, upon the release of the external pressure these small loci of gas under pressure in cells expand to expand the rubber and form cells of gas throughout the rubber mix. If heat be further applied, such heat may exert an additive expanding force to these gas cells. This is in conformity with the ordinary laws of expansion as set forth in Charles' law.

Alternatively to the process above set forth, gas may be applied to the rubber mix externally before heat is applied to decompose or set off the chemical blowing agent homogeneously distributed throughout the rubber mass internally. This external application of gas forms seeds of gas throughout the rubber mass which are loci of gas development. Then when the pressure of the externally applied gas is reduced allowing these seeds to expand to form gas cells within the rubber mix, sufficient heat is applied to set off the chemical blowing agent that has been distributed throughout the rubber so that an ended quantity of the increased gas production therefrom is added to the normally expanded gas cells produced by the externally applied gas. This expansion of the chemical blowing agent is facilitated because the cells formed by the externally applied gas have already opened the way for gas production. Thus the resistance of the mass to this gas developed from the chemical blowing agent is materially lessened.

These processes above set forth with respect to the use of the combination of internal and external blow permit a much larger volume of gas to be centered within the particular loci of gas cells throughout the rubber mass and effectively act to prevent the escape of externally applied gas after the pressure is released.

Two specimens of the rubber mix, the composition of which has been set forth hereinbefore were prepared. In one of these mixes there was incorporated a relatively small amount of chemical blowing agent, diazoaminobenzene. These two samples were then subjected to a pressure of 500 lbs. of nitrogen gas externally applied. The sample containing the diazoaminobenzene had an average blow ratio of 3 to 1, and the sample without the diazoaminobenzene had an average blow ratio of 1.9 to 1.

Two similar samples were then subjected to the pressure of a thousand lbs. per sq. in. of nitrogen gas externally applied and the sample containing the diazoaminobenzene had a blow ratio of 4.75 to 1 while the sample without the diazoaminobenzene had a blow ratio of 2.5 to 1.

Thus it can be seen that an approximately 100 per cent increase in blow is achieved by the use of low external pressures and a small amount of contained chemical blowing agent. It is possible to obtain, by the use of our process, a gas expanded rubber with a density on the order of 3 lbs. per cu. ft.

A large range of pressure with reference to the externally applied gas may be employed. Thus, excellent results have been obtained with pressures ranging from 500 to 2500 lbs. per square inch. The amount of pressure used depends upon the expansion desired and upon the amount of chemical blowing agent incorporated in the mix. The amount of pressure also depends upon the solubility in the rubber of the particular gas used.

Our theory as to the physical action involved in this method presents an analogy to the carbonation of water with carbon dioxide gas. That is, when water in the ordinary syphon is subjected to carbon dioxide under pressure and the pressure is released, small seeds of gas appear throughout the water. As the pressure is removed entirely these seeds of gas tend to come out of solution and escape. Upon release of pressure these seeds increase greatly in volume and become bubbles. In the production of gas expanded rubber, it is desired to have large bubbles of gas permanently contained within the rubber. Pressure cannot be maintained upon the rubber since otherwise the gas seeds would not enlarge to form bubbles. To maintain the gas within the rubber therefore, the fibre strength or plasticity of the rubber must be so controlled so that, after injection, such gas will remain in place and not escape from the rubber, if the pressure is released. This can be effected in certain ways, as for example, by partial vulcanization. However, such partial vulcanization has a tendency to make the rubber so stiff that less than the maximum expansion is obtained.

The necessity for partial vulcanization to retain the gas within the rubber can be eliminated if an ultra fast accelerator is employed so that the rubber can be converted from a plastic stage to a cured or set stage so quickly that the gas will be retained within the mass.

A special advantage of our process set forth herein lies in its utility in making closed cell gas expanded rubber in which the rubber is given a partial vulcanization before the gassing operation. One of the major difficulties of making closed cell gas expanded rubber lies in the fact that the externally injected gas can not be retained in the rubber prior to the final curing thereof. This has been overcome by partially vulcanizing the rubber before the gas is injected therein. The partial vulcanization gives the rubber sufficient fibre strength to retain such injected gas. However, such partial vulcanization renders rubber so stiff that the desired expansion is often difficult to obtain.

As pointed out in Patent No. 2,110,400 to F. W. Peel, patented March 8, 1938, when the rubber is given a partial vulcanization it can be gassed in a cold chamber, that is an unheated chamber. The use of an unheated gassing chamber effects great economy in this process. It is extremely difficult and expensive both to manufacture and operate a high pressure autoclave in which a rubber plasticizing heat must be developed within the autoclave. But, when an unheated gassing chamber is used, the rubber is gassed cold and it is difficult to expand it because it does not have sufficient plasticity. Thus, when the rubber is stiff from prevulcanization and unplasticized, as when gassed cold, the problem of gassing and obtaining expansion is a serious one.

A desirable expansion is almost impossible to obtain within the commercially practical pressure limits. We have found that if we incorporate in the rubber mix a chemical blowing agent and subject the rubber mix to a partial vulcanization, the partially vulcanized rubber, when subjected to an externally applied gas and sufficient heat to set off the internally contained chemical blowing agent, achieves a very desirable volumetric expansion. Thus a partially vulcanized rubber, by means of the combined internal and external blow can be given a commercially practical volumetric expansion by means of externally applied pressure on the order of 1,000 lbs.

The process set forth herein is of special utility when used in conjunction with the process of Lester Cooper, one of the applicants of the present invention, set forth in application Serial No. 139,459, filed April 28, 1937, for Manufacture of expanded rubber. In the process set forth in that application certain factors render a very high degree of expansion difficult to obtain except when high pressures are used. But, when the internally developed gas, as set forth in the present application, is used in conjunction therewith very satisfactory results have followed.

Thus, the combined internal and external blow has proved to be of unexpected utility, both broadly as set forth in this application and also with respect to certain specific processes developed herebefore using external pressure alone. We find that the nature of the final product obtained depends upon the degree of plasticity of the rubber mass. If the material is as fluid as water, the gas bubbles, as in carbonated water, will rise to the surface and escape and leave no gas within. If the plasticity of the mass is sufficient to maintain a certain amount of strength in the rubber, when channels are formed within the rubber by the escaping gas a sponge or open celled rubber is obtained. If, however, the rubber mix is given sufficient strength or firmness so that the gas developed within and applied externally is entrapped and prevented from escaping, the developed gas forms individual bubbles homogeneously throughout the mass, the bubbles being isolated from each other and sealed each in itself, a closed cell gas expanded rubber is obtained. It is this closed cell form of expanded rubber which we prefer to produce.

However, it is obvious that an open cell or sponge rubber can be produced by this process by proper control of the elements such as plasticity fibre strength and blow ratio. The processes set forth herein have dealt primarily with the gassing operations since it is those with which we are now concerned. The problems of obtaining closed cell or open cell structures have been briefly dealt with above. The method of expanding and curing at desired stages and the many variations involving placement of the raw materials at different stages in the processes have been fully dealt with in our co-pending applications.

Many modifications of the above processes are obvious from the principles set forth. We are primarily concerned with the new and unexpected results obtained by a combination of the external and internal blow and wish to be limited only by the appended claims.

We claim:

1. A method of making closed cell gas expanded rubber which comprises forming a rubber mix containing a chemical blowing agent; subjecting said rubber mix to gas under pressure of the order of 1000 pounds per square inch to gas impregnate the rubber throughout its mass; concurrently heating the rubber mix to evolve gas from the chemical blowing agent contained therein and to partially vulcanize the rubber to give the rubber sufficient consistency so as to retain the gas within the rubber in the form of closed cells; releasing the gas pressure externally applied and vulcanizing the closed cell gas expanded in timed relation to the gassing of the rubber to prevent escape of the gas rubber.

2. A method of making closed cell gas expanded rubber which comprises forming a rubber mix containing a nitrogen bearing chemical blowing agent capable of releasing nitrogen upon application of heat; subjecting said rubber mix to nitrogen gas under pressure on the order of 500 to 2000 pounds per square inch; heating the rubber mix to evolve nitrogen gas from the chemical blowing agent contained therein and to partially vulcanize the rubber to give the rubber sufficient consistency so as to retain the gas within the rubber in the form of closed cells; expanding the rubber by means of the combined gas action and vulcanizing the closed cell gas expanded rubber in timed relation to the gas impregnation of the rubber to prevent escape of the gas from the rubber.

3. A method of making closed cell gas expanded rubber which comprises forming a rubber mix containing a chemical blowing agent capable of releasing nitrogen upon application of heat; maintaining a fibre strength of the rubber as will prevent escape of gas or formation of intercommunicating cells within the rubber; subjecting said rubber mix to nitrogen gas under pressure of the order of 2000 pounds per square inch to gas impregnate the rubber throughout its mass; heating the rubber mix to evolve gas from the chemical blowing agent contained therein and to partially vulcanize the rubber to give the rubber sufficient consistency so as to retain the gas within the rubber in the form of closed cells; expanding the rubber by means of the combined effect of said gases; and vulcanizing the closed cell gas expanded rubber.

4. A method of making closed cell gas expanded rubber which comprises forming a rubber mix containing a nitrogen bearing chemical blowing agent; partially vulcanizing said rubber mix; subjecting said rubber mix to an unheated nitrogen gas to gas impregnate the rubber throughout its mass; heating the rubber mix to evolve nitrogen gas from the chemical blowing agent contained therein and to partially vulcanize the rubber to give the rubber sufficient consistency so as to retain the gas within the rubber to the form of closed cells; expanding the partially vulcanized rubber by means of the combined effects of the externally applied and internally developed gas; and vulcanizing the closed cell gas expanded rubber.

DUDLEY ROBERTS.
LESTER COOPER.